Aug. 1, 1933.                    A. L. RIKER                    1,920,436
                              VIBRATION INSULATOR
                              Filed March 13, 1931
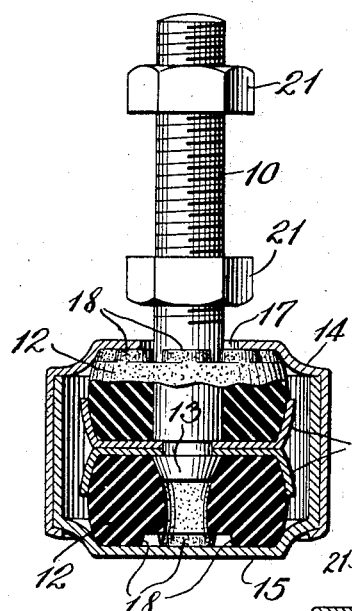
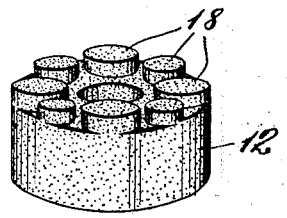
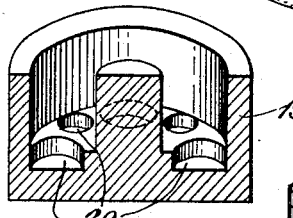
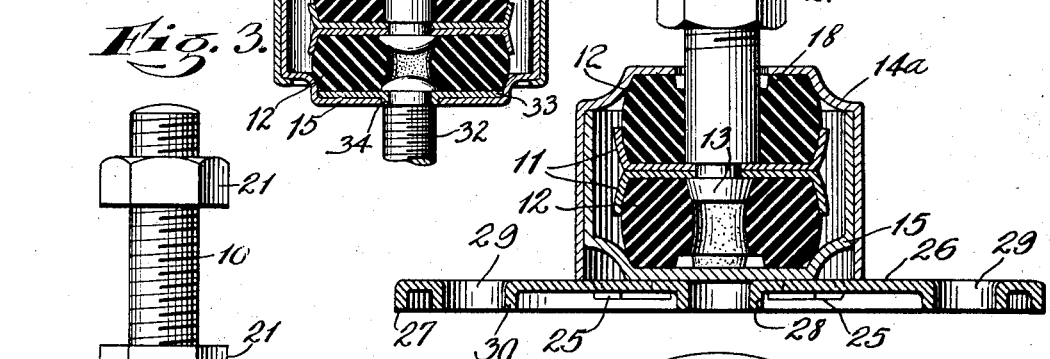
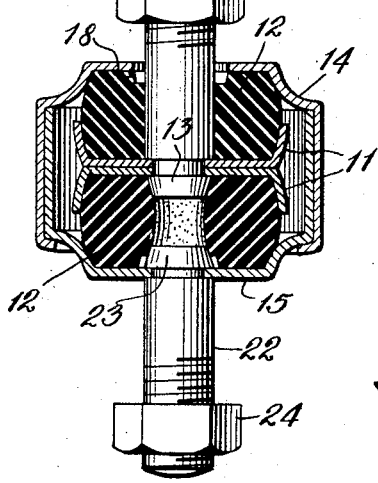
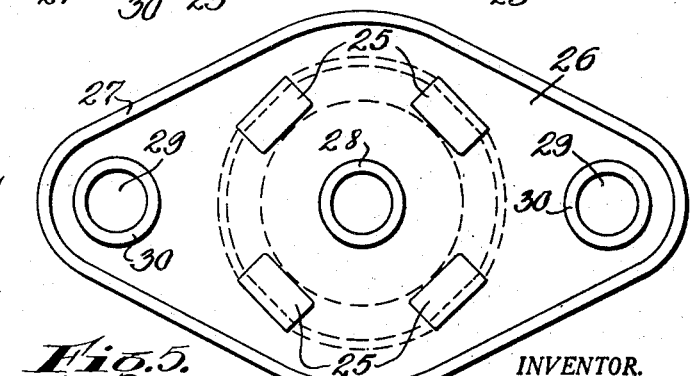
INVENTOR.
ANDREW L. RIKER
BY
ATTORNEY Patented Aug. 1, 1933

1,920,436

UNITED STATES PATENT OFFICE 1,920,436

VIBRATION INSULATOR

Andrew L. Riker, Fairfield, Conn., assignor to Rubber Shock Insulator Corporation, Bridgeport, Conn., a Corporation of Delaware Application March 13, 1931. Serial No. 522,286

5 Claims. (Cl. 248—16)

My invention relates to vibration insulators for the mountings of machinery or mechanical devices to absorb shocks and vibrations or to obstruct the transmission of shocks and vibrations to or from said devices.

An object of the present invention is to provide a vibration insulator which can be produced at a lower manufacturing cost.

In my copending application Serial No. 447,504, filed April 26, 1930, I show a vibration insulator comprising a bolt with a head thereof embedded in a damping element composed of a pair of rubber disks, said element being confined in a casing adapted to be secured to a support. As pointed out in said application, rubber is virtually incompressible and when subjected to pressure it is merely distorted. Consequently, space must be provided either in the rubber or in the casing into which the rubber may flow when it is distorted by the shocks or vibrations. In said copending application, the casing fits closely against the damping element but the latter is provided with peripheral slots to allow for the flow of the rubber.

An object of the present invention is to provide a different form of mounting for the damping element in which there will be greater freedom of movement laterally.

Another object of the invention is to provide a damping element of novel form in which provision is made for the flow of the rubber, the element being of such shape that the mold in which it is formed will be very simple and capable of being produced at low expense.

Other objects and advantages of the invention will appear in the following description of several embodiments thereof and thereafter the novelty and scope of the invention will be pointed out in the claims.

In the accompanying drawing:

Figure 1 is a view in longitudinal section of my improved insulator;

Fig. 2 is a view in perspective of a preferred form of damping member used in the insulator;

Fig. 2a is a perspective view in vertical section of a mold in which the damping member is formed;

Fig. 3 is a view in longitudinal section of a modified form of vibration insulator;

Fig. 4 is a view in longitudinal section of another modified form of vibration insulator;

Fig. 5 is a bottom plan view of the same; and

Fig. 6 is a view in longitudinal section of still another modified form of vibration insulator.

The embodiment of my invention shown in Fig. 1, comprises a bolt 10 to the inner end of which a pair of cup shaped spacers 11 are riveted. The spacers are formed of sheet metal placed back to back; in other words, they are oppositely cupped.

Each spacer is adapted to receive a damping member consisting of a rubber collar 12. One of these collars is fitted upon the shank of the bolt, while the other fits over the head 13 formed on the end of the bolt. The damping members are held under a predetermined normal compression in a casing formed of two telescoping cup-shaped members 14 and 15 respectively. The outer casing member 14 is peened over at its rim to hold the two members together and is also formed with an aperture 17 to pass the shank of the bolt 10 with considerable clearance. The casing is preferably of larger diameter than the spacers 11 but the end walls of the casing members 14 and 15 are outwardly offset to form seats in which the collars 12 fit snugly.

The collars 12 are preferably of the form shown in Fig. 2, each consisting of a cylindrical block of rubber with a central bore and provided on one end face with lugs 18. This damping member may be readily formed in a mold 19 of the type shown in Fig. 2a. The mold is of annular form and in the end wall thereof holes 20 are bored to form the lugs 18. It is obvious that a mold of this character may be very cheaply produced. The lugs 18 serve to increase the flexibility of the damping member because when the rubber is subjected to pressure it may flow into the spaces between the lugs. The flexibility or softness of the damping member is controlled by varying the number and size and depth of the holes 20 in the mold.

It will be understood that by the term "rubber" I mean to include any material having characteristics similar to rubber and the term as used above and hereinafter in the claims as well as the specification is intended to be so interpreted.

The vibration insulator is adapted to be used in a great many different ways to prevent the transmission of vibrations from one device or mechanical element to another. Thus, in service the casing is clamped or otherwise secured to one of the elements while the other element is supported on the bolt 10 by means of nuts 20. The rubber collars 12 are subjected to a predetermined normal compression, as explained above, and in service any shocks transmitted to the bolt 10 will be absorbed by the collars 12 and cannot pass through to the casing. Conversely, vibrations transmitted to the casing will be prevented from passing through to the bolt 10. The lugs 18 reduce the bearing area of the outer face of each collar and increase the flexibility of the collar, allowing ample room for flow of the rubber when distorted by vibrations and shocks. Also because the spacing members 11 are of smaller diameter than the casing member 15, the bolt 10 is free to oscillate, because although the lugs 19 bear firmly against the end walls of the casing, the cup spacing members 11 may move laterally with respect to the casing.

The construction shown in Fig. 3 is very similar to that shown in Fig. 1, and similar parts are given like reference numerals in the drawing. The principal difference between the two constructions lies in the fact that the inner telescoping member 15 is riveted to a bolt 22 by which the casing may be attached to one of the elements above referred to. The rivet head 23 of the bolt 22 is adapted to enter the bore of the lower collar 11. The bolt 22 is threaded and is provided with a nut 24 which may be used to clamp the casing to a suitable support.

The construction shown in Fig. 4 is very similar to that shown in Fig. 1, except that in this case a base plate is provided on the casing by means of which the casing may be attached to a suitable support. The casing comprises an outer cup-shaped member 14a and an inner cup-shaped member 15a. The member 14a differs from the member 14, shown in Figs. 1 and 3, in that it is not peened over the member 15, but is provided with tongues 25 which are adapted to pass through slots in a base plate 26. These tongues are then bent over, as clearly shown in Fig. 5, to clamp the member 14a to the base plate. The parts are so proportioned that when the member 14a is clamped to the base plate, the member 15 will press against the collars 12 subjecting them to a predetermined normal compression. The member 15 thus bears at one end against the base plate 26, while its upper rim bears against the end wall of the member 14a.

The base plate 26 is preferably made of sheet metal and in order to space the body of the plate away from the support to which the casing is to be attached so that there will be clearance for the tongues 25, the base plate is provided with a marginal rim 27. At the center of the base plate there is an annular flange 28 which is also turned downward to bear against the support and to provide an unyielding support for the cup member 15. As shown in Fig. 5, the base plate is substantially diamond shaped and is provided near opposite ends with bolt holes 29 by means of which it may be attached to a suitable support, and an annular bearing flange 30 surrounds each bolt hole to provide an unyielding support for the bolts.

The construction shown in Fig. 6 resembles that illustrated in Fig. 3 but differs therefrom in the fact that the lower bolt 32 is not riveted to the casing member 15 but is riveted instead to a reinforcing disk 33 which fits between said casing member and the adjacent collar 12. The disk 33 is formed with a rivet hole which is bordered by an outwardly extending flange 34. This flange provides a large bearing between the bolt and disk which gives increased strength to the riveted joint and the disk provides a reinforcement for the end wall of the casing member 15. Thus the construction shown in Fig. 1 is somewhat stronger than that shown in Fig. 3.

Having thus described my invention, what I claim as new and desire to secure by Letters Patent is as follows:

I claim:

1. A vibration insulator comprising a casing formed interiorly with seats at opposite ends thereof, a damping element comprising a pair of rubber blocks respectively engaging said seats, each block being formed at its outer end with lugs bearing against said seats, a pair of oppositely cupped spacers in which the inner ends of the blocks are seated, and a bolt riveted to the spacers and passing axially through one of the blocks and the casing, the latter being formed with an opening to clear the bolt and also being peripherally spaced from the damping element.

2. A vibration insulator comprising a casing formed interiorly with seats at opposite ends thereof, a damping element comprising a pair of rubber blocks respectively engaging said seats, each block being formed at its outer end with lugs bearing against said seats, a pair of oppositely cupped spacers in which the inner ends of the blocks are seated, a supporting member riveted to the spacers and passing axially through one of the blocks and the casing, the latter being formed with an opening in one end to clear the supporting member and also being peripherally spaced from the damping member, and a bolt riveted to the other end of the casing and providing means for securing the casing to a base, said bolt being axially aligned with said supporting member.

3. A vibration insulator comprising a bolt, a pair of cupped disks placed back to back and riveted to the bolt, a cylindrical rubber block seated in each cupped disk, and a casing comprising two telescoping cupped members of sheet metal and of considerably larger diameter than said disks, of said members being formed respectively with seats against which the outer ends of the blocks are seated, and being also secured together to hold the blocks under a predetermined normal compression, one of said members having an opening therein of considerably larger diameter than the bolt and through which said bolt projects.

4. A vibration insulator comprising a bolt, a pair of cupped disks riveted back to back upon the bolt, a cylindrical rubber block seated in each cupped disk, a casing comprising two telescoping cupped members of sheet metal and of considerably larger diameter than the blocks, said cup members being formed respectively with seats against which the outer ends of the blocks are seated and one of said cup members being formed with an opening to pass the bolt with considerable clearance, and a base plate formed with slots, the outer cup member having tongues passing through the slots and bent over to clamp the casing to the base plate and to secure the cup members together.

5. A vibration insulator comprising a casing, a reinforcing disk within the casing and bearing against an end wall thereof, a damping element comprising a pair of rubber blocks bearing at their outer ends respectively against said disk and the opposite end wall of the casing, a pair of oppositely cupped spacers in which the inner ends of the blocks are seated, a bolt riveted to said disk and passing through the adjacent end wall of the casing, and a supporting member secured to the spacers and passing through said opposite end wall, the latter being formed with an opening to clear the supporting member.

ANDREW L. RIKER.